No. 734,269. PATENTED JULY 21, 1903.
T. LANSTON.
HORSESHOE.
APPLICATION FILED OCT. 6, 1902.
NO MODEL.
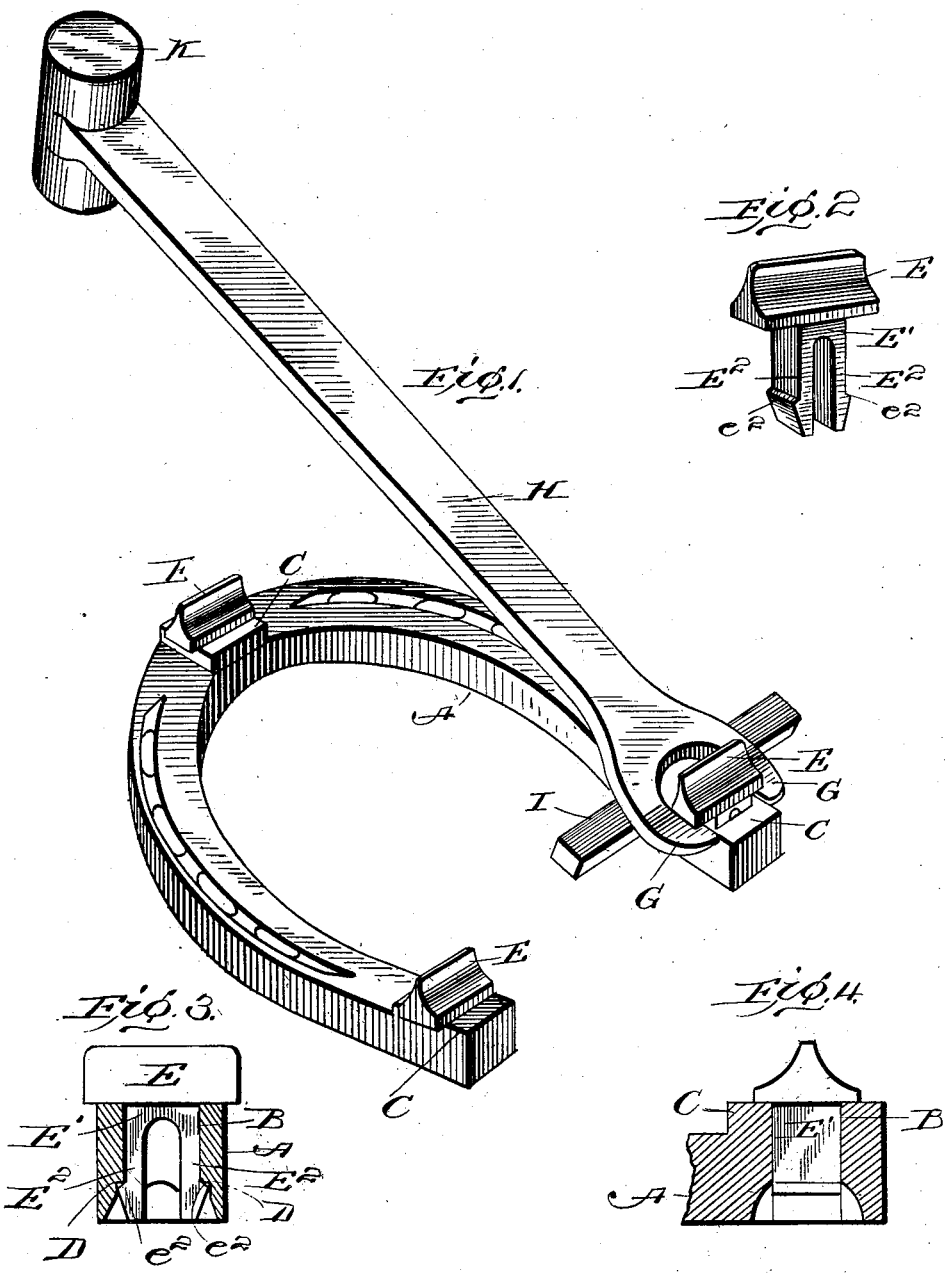

No. 734,269. Patented July 21, 1903.

UNITED STATES PATENT OFFICE.

TOLBERT LANSTON, OF WASHINGTON, DISTRICT OF COLUMBIA.

HORSESHOE.

SPECIFICATION forming part of Letters Patent No. 734,269, dated July 21, 1903.

Application filed October 6, 1902. Serial No. 126,154. (No model.)

*To all whom it may concern:*

Be it known that I, TOLBERT LANSTON, of Washington, District of Columbia, have invented certain new and useful Improvements in Horseshoes; and I do hereby declare the following to be a full, clear, and exact description of the same, reference being had to the accompanying drawings, and to the letters of reference marked thereon.

The present invention relates to improvements in horseshoes, the objects of the invention being to provide for the ready application, removal, or renewal of calks employed to prevent slipping or to increase the wearing qualities of the shoe.

The invention consists in a shoe having suitable sockets therein enlarged at the inner ends with calks having stems the bases of which fit the outer portion of the sockets accurately, while the extremities of the stems are bifurcated, provided with portions to enter the enlarged portions of the sockets and made resilient, whereby they may be forced into position or withdrawn, as desired or found necessary, without removing the shoe from the hoof and without the employment of special tools to effect the attachment.

The invention further consists in certain novel details of construction and combinations and arrangements of the parts, all as will be now described, and pointed out particularly in the appended claims.

Referring to the accompanying drawings, Figure 1 is a perspective view of a horseshoe with an implement in position for withdrawing one of the calks. Fig. 2 is perspective view of one of the calks. Fig. 3 is a sectional view through the shoe and one of the calks, taken transversely of the line of strain or from side to side. Fig. 4 is a section in a plane at right angles to Fig. 3.

Like letters of reference in the several figures indicate the same parts.

The shoe itself (lettered A) is shown as of conventional form; but it is obvious that the form or means for attaching the shoe to the hoof of the animal is immaterial in so far as the present invention is concerned. At the desired points—usually the heel and toe of the shoe—suitable sockets or apertures B are formed, preferably, though not necessarily, extending way through the shoe, and to strengthen and increase the thickness of the shoe around the sockets it is preferably provided with enlargements of integral flat-faced calks C, these being especially desirable on light and thin shoes when the body of the shoe would not afford the necessary strength, and in all instances the construction raises the bases of the removable calks above the plane of the shoe, thereby facilitating the removal of the calks, as will presently appear.

The sockets are preferably rectangular in cross-section, and the inner ends are somewhat enlarged on one dimension, as shown in Fig. 3, forming shoulders D for retaining the calks in position.

The calks E may be of any desired configuration best adapted for the condition of the roads or the character of the horse or work to be performed by him, such calks in every instance, however, having stems $E'$, the bases, at least, of which fit the outer portion of the sockets accurately, while their ends are bifurcated, forming arms $E^2$, each of which is provided with a shoulder or engaging portion $e^2$ for coöperation with the corresponding shoulder in the socket. The arms $E^2$ are properly formed at the ends to readily enter the outer ends of the sockets and are sufficiently resilient to permit of their being sprung toward each other as they are driven into position and to spring outwardly with considerable force when the shoulders pass into the enlarged portion of the socket.

In order that the strains to which the calk is subjected in use may not work the same loose, the bifurcation in the shank preferably extends lengthwise of the shoe. In this plane the shank is practically rigid, and the greatest breadth of the arms is opposed to strains tending to break the same. To still further strengthen the construction, the base of the shank is preferably solid.

The shank and its socket being rectangular in cross-section prevents the turning of the calk, and the shank being of less length than the thickness of the shoe does not project on the inner side, thus avoiding any possible injury to the hoof.

To facilitate the removal of the calks, they preferably extend beyond the sides of the shoe or beyond the sides of the enlargement thereon, thus permitting of the entry beneath them of the prongs G of a claw implement H, and by using the implement as a lever the calks may be readily removed, the shoulders being sufficiently inclined to permit of withdrawal by heavy direct pressure, but sharp enough to hold against all strains incident to use. For removing the toe-calk, the implement is provided with a cross-bar I, which resting on the shoe at each side forms a fulcrum. The opposite end of the implement is preferably in the form of a hammer K, with which the calks may be driven into place. Obviously with this invention the calks may be conveniently changed to suit the condition of the road without the necessity of removing the shoes or going to the shop to have the work done.

Having thus described my invention, what I claim as new, and desire to secure by Letters Patent, is—

1. The combination with a horseshoe having sockets formed therein enlarged at their inner ends forming shoulders, of calks having shanks fitting said sockets and bifurcated, the arms so formed being made resilient and provided with shoulders coöperating with the shoulders in the socket, when the shank is forced into place to hold the calk; substantially as described.

2. The combination with a horseshoe having sockets formed therein enlarged on each side at their inner ends to form shoulders, of calks having shanks fitting said sockets and bifurcated from front to rear of the shoe, the arms so formed being resilient, shouldered in proximity to their ends and adapted to be pressed toward each other in passing into the socket, whereby said arms will automatically spread and the shoulders interlock with the shoulders in the socket when the calk is seated; substantially as described.

3. In combination with a horseshoe having sockets formed therein, rectangular in cross-section and enlarged at their inner ends toward each side of the shoe to form shoulders, of calks having shanks, rectangular in cross-section to fit the sockets and bifurcated in planes from front to rear of the shoe, the arms so formed being resilient and provided with shoulders coöperating with the shoulders of the sockets when the calks are seated; substantially as described.

4. The combination in a horseshoe having sockets therein provided with shoulders near their inner ends running from front to rear of the shoe, of calks having shanks fitting said sockets and bifurcated, the arms so formed being made resilient and provided with shoulders near their inner ends adapted to coöperate with the shoulders in the sockets when the shank is forced into place to hold the calk; substantially as described.

TOLBERT LANSTON.

Witnesses:
ALEXANDER STEUART,
THOMAS DURANT.